US010463027B2

(12) United States Patent
Boudreau

(10) Patent No.: US 10,463,027 B2
(45) Date of Patent: Nov. 5, 2019

(54) SYSTEM AND APPARATUS FOR THE PRESERVATION AND TRANSPORTATION OF PRODUCTS INCLUDING LIVE AQUATIC SPECIES

(75) Inventor: Joseph Edward Boudreau, Nova Scotia (CA)

(73) Assignee: 3225335 Nova Scotia Limited, Antigonish, Nova Scotia (*) Notice: Subject to any disclaimer, the term of this patent is extended or adjusted under 35 U.S.C. 154(b) by 625 days.

(21) Appl. No.: 12/514,551

(22) PCT Filed: Feb. 11, 2008

(86) PCT No.: PCT/CA2008/000269
§ 371 (c)(1),
(2), (4) Date: May 12, 2009

(87) PCT Pub. No.: WO2009/100515
PCT Pub. Date: Aug. 20, 2009

(65) Prior Publication Data
US 2011/0061599 A1 Mar. 17, 2011

(51) Int. Cl.
*A01K 63/02* (2006.01)
*B60P 3/04* (2006.01)

(52) U.S. Cl.
CPC ................ *A01K 63/02* (2013.01); *B60P 3/04* (2013.01)

(58) Field of Classification Search
CPC .................................. A01K 63/02; B60P 3/04
(Continued)

(56) References Cited

U.S. PATENT DOCUMENTS 3,192,899 A 7/1965 Lucey et al.
3,401,671 A * 9/1968 Axelrod et al. .............. 119/203
(Continued)

FOREIGN PATENT DOCUMENTS

EP 0072334 A1 2/1983
FR 2550917 A1 3/1985
(Continued)

OTHER PUBLICATIONS

Extended European Search Report, Application No. EP 08714592.6 dated Dec. 3, 2013.

*Primary Examiner* — Son T Nguyen
(74) *Attorney, Agent, or Firm* — MacMillan, Sobanski & Todd, LLC

(57) ABSTRACT

A moveable vehicle such as a truck, railway carriage, or the like is structured and dimensioned to enable the transportation of products including live aquatic species such as fish in a refrigerated condition. The vehicle includes insulating and heat exchange layers which when utilized to transport live aquatic species may maintain them in a dormant state by temperature controls within the refrigeration system. A water spraying assembly provides a humidity and oxygen level for disposing of waste and also enables the spraying of fog to provide effective humidity between spraying cycles. Any existing animal waste is treated in the water and a recirculation or closed loop system is provided. A product storage area facilitates loading and unloading and a separate storage room may be provided to house the systems equipment or optionally may be attached to the vehicle. It is contemplated that when refrigerated products which do not develop waste are transported in that event use of at least components of the water and filtration system may be selectively discarded as the operator deems appropriate for effective utilization of the system.

17 Claims, 8 Drawing Sheets

(58) Field of Classification Search
USPC ....... 119/201, 202, 203, 211, 214; 236/49.1; 165/135, 136
See application file for complete search history.

(56) References Cited

U.S. PATENT DOCUMENTS

| | | | | |
|---|---|---|---|---|
| 3,687,111 | A * | 8/1972 | Epper | 119/201 |
| 3,727,579 | A | 4/1973 | Lee | |
| 3,735,575 | A * | 5/1973 | Hattori | 57/331 |
| 3,961,925 | A | 6/1976 | Rhoad | |
| 4,089,298 | A * | 5/1978 | Wilson | 119/201 |
| 5,177,777 | A | 1/1993 | Niino | |
| 5,237,959 | A | 8/1993 | Bergeron | |
| 5,309,868 | A * | 5/1994 | Tomiyama | A01K 63/02 119/203 |
| 5,572,952 | A | 11/1996 | Manome | |
| 2001/0015178 | A1 * | 8/2001 | LaRosa | 119/201 |
| 2003/0188695 | A1 * | 10/2003 | Robohm | 119/203 |
| 2007/0095523 | A1 * | 5/2007 | Kristinsson | 165/299 |
| 2007/0245971 | A1 | 10/2007 | Rayner | |
| 2008/0178629 | A1 * | 7/2008 | Meether | 62/451 |

FOREIGN PATENT DOCUMENTS

| | | | |
|---|---|---|---|
| FR | 2572252 | B1 | 6/1987 |
| JP | 2004242620 | A | 9/2004 |
| WO | 02/056677 | A1 | 7/2002 |
| WO | 03032721 | A1 | 4/2003 |

* cited by examiner

SYSTEM AND APPARATUS FOR THE PRESERVATION AND TRANSPORTATION OF PRODUCTS INCLUDING LIVE AQUATIC SPECIES

CROSS-REFERENCE TO RELATED APPLICATION

This application is a National Phase of International Application PCT/CA08/000269 filed Feb. 11, 2008, which designated the U.S. The disclosures of that application is incorporated herein by reference.

FIELD OF THE INVENTION

The invention relates to a system for transporting products including live aquatic animals. In particular, the invention relates to a micro-environment for live aquatic animals, which can be monitored and controlled locally and remotely. More particularly, the invention relates to an apparatus, a system and a method which provide the living conditions required to sustain products and live aquatic animals in transportation over long distances. The system of the present invention may be practical and utilized in apparatus in the form of a trailer, railway car or similar vehicle adapted to accommodate the system enclosed herein.

BACKGROUND OF THE INVENTION

Aquatic animals such as, for example, crustaceans are an important food source (seafood). Crustaceans must typically be kept alive until just before they are to be eaten. This has created a need, for efficiently transporting live seafood, as well as a simple and efficient means for keeping the seafood alive for long periods of time.

When preservation of live seafood is intended for only a matter of hours, a typical means of transportation known in the art includes boxes or crates filled with ice. However, when using the above means of transportation and when seafood is to be transported a longer distance it has been necessary to transport the seafood by air. Airfreight has been used to transport seafood, as well as fresh produce and other organic food. However, there are several disadvantages associated with air-freighted food. In particular, the cost of packaging, including gel packs to keep the product cool, is expensive; logistics and handling are complex, since the food has to be loaded on a truck, airlifted to the desired destination, and then unloaded onto a truck to be delivered to the purchaser, which results in operating costs that are prohibitively expensive. In addition, air transport is not, at the present time, environmentally friendly due to the amount of packaging used and the amount of fuel necessary to transport relatively low volumes of food. In addition, the cost of carbon emissions may result, in the near future, in a reduction of food which is air-transported.

As an alternative to air-freight ground and/or sea transportation systems for seafood are also known in the art and usually consist of containers filled with water or seawater. The live aquatic animals, which may be transported in such containers, include mollusks, crustaceans, and fishes. The transportation of aquatic animals over long distances posses a significant challenge since, when the animals have been contained in the water for a long period of time, the water will be contaminated by their body wastes and oxygen in the water will be decreased: Accordingly, the mortality rates are very high.

The problem of transporting live aquatic animals and the context in which this problem was considered are discussed below. US Patent Application No 2007/0245971 to Rayner describes a bulk produce transport container including a tank capable of supporting a wet environment. The system described by Rayner primarily uses water as an environment for the live aquatic animals. In addition, in the system described by Rayner loading of the product is done through a manhole at the top of the tanktainer or in tanks of water.

European Patent No. 72,334 to Martin discloses a process for keeping alive aquatic animals, such as crustaceans, during transport thereof, in which the animals are placed and maintained in a water-tight space.

U.S. Pat. No. 3,727,579 to Lee discloses a system and method for preservation and transportation of lobsters, wherein temperature-conditioned aerated salt water is continuously sprayed upon the lobster in a container from the time it is caught until it is finally Sold:

U.S. Pat. No. 3,192,899 to Lucey et al. discloses a somewhat similar development to Lee's invention, viz a unit for storage of live shellfish, in particular crawfish and lobsters, comprising a plurality of trays vertically disposed one upon another, each tray having at least one perforation therein, the uppermost tray being provided with a sea-water feeding device. The unit may be provided with a means for recirculating the water, and refrigeration means to cool directly the water or the air.

Japanese Patent Application No. 2004242620 to Yamamoto et al., International Patent Application PCT/NO2002/328 to Lyngstad, and French Patent Application No. 2,550,917 to Jean-Francois Toulouse are representative of applications and/or patents discussing vehicle-mounted water tanks for fishes for storing water and having at least one feed pipe and at least one discharge pipe for discharging water, and a pumping means for circulating and flowing water. In addition. U.S. Pat. Nos. 5,177,777, 5,309,868, and 5,572,952 to Niino, Tomiyama and Manome, respectively, disclose putting the live fish into a hibernation-like state by cooling the fish to a temperature within a temperature range which provides conservation of the fish without being harmful to the fish. In many of the above-identified prior art documents the product is immersed in water thereby limiting the payload due to the large volume of water that is required.

The invention was developed in recognition of the need for a more efficient transportation system for live aquatic animals over long distances.

SUMMARY OF THE INVENTION

As used herein the term "seafood" is intended to refer not only to edible marine fish and shellfish taxonomically classified but also to aquatic animals, including inter alia, "fishery products" such as, for example, saltwater fish, freshwater fish, Crustacea, Mollusca, and Reptilia.

As used herein the term "product" refers mainly to seafood, but can also refer to produce and/or other organic food as well as plant, or any matter that requires preservation.

As used herein the term "water" is intended to comprise freshwater, seawater, synthetic seawater, plant water, distilled water, or mixtures thereof.

As used herein the term "tray" is intended to comprise totes, boxes, tubs or other devices used to contain or hold the product during transport.

An object of the present invention is, thus, to provide a method and system for transporting live aquatic animals, in particular, seafood, over long distances.

In accordance with an aspect of the present invention, there is provided a system for transporting a product, such as, for example live aquatic animals, in particular seafood preferably, but not limited to, shellfish/fish, over, long distances, comprising a container; one or more than one tray for containing the product; a means for spraying liquid into the container and onto the tray for preserving the product and permitting the sprayed liquid to drain from the container; a means for collecting the drained liquid from the container and returning the liquid to the means for spraying; a means for filtering the drained liquid before returning the liquid to the means for spraying, the filter means comprising a liquid treatment system and filtration units.

The temperature inside the container is, preferably, maintained constant with a view to preserving the product. The container may be provided with an insulated layer and/or a heat exchanger mounted on each side of the container.

The container may include one or more than one drain in the bottom thereof and one or more than one collecting receptacle, preferably, mounted below the container. The collecting receptacle may also be mounted on the sides or on top of the container in which instance any other known drain and/or a means for collecting/pumping the liquid from the container in the receptacle may be used.

In accordance with another aspect of the present invention, there is provided a self-contained preservation system for transporting a product comprising: a trailer vehicle comprising a trailer chassis having front and rear end portions, a plurality of wheel supports attached to the trailer chassis, a ground engaging wheel rotatably mounted to each of the wheel supports chassis; the trailer chassis comprising an elongated platform having four side walls projecting upward from said platform and an elongated top frame member extending between said side walls to define an enclosed space, wherein the space is partitioned into a product storage compartment/area and a mechanical chamber/room; one or more than one tray; a means for spraying liquid into the product storage compartment and onto the tray for preserving the product and permitting the sprayed liquid to drain from the container; a means for collecting the drained liquid and returning the liquid to the means for spraying; a means for filtering the drained liquid before returning the liquid to the means for spraying, the filter means comprising a liquid treatment system and filtration units. Preferably the liquid is water.

In the operation of the apparatus and the system of the present invention it is contemplated that when refrigerated products which do not develop waste are transported use of at least all the components of the water and filtration system may be selectively discarded as the operator deems appropriate for effective utilization of the system.

The product may be contained in a plurality of trays which may be placed on pallets for easy loading/unloading, in vertical arrangement one upon the other inside the trailer. The trailer may also comprise a man-door, and mechanical room to house the system equipment or the equipment may be attached to the trailer.

The system for transporting live aquatic animals of the invention may also be referred hereinafter as Live Seafood Transport System (LSTS).

The system may include a controller for monitoring and controlling the entire system for both automatic and manual operation may. The controller preferably comprises a Programmable Logic Controller (PLC), which may be preprogrammed with modes and cycles. The PLC may control the temperature, humidity, pressure or any other parameter deemed necessary inside the product storage compartment/area.

The integrated liquid (water) treatment system may comprise two reservoir tanks, one or more biofilters with bead collectors, a bio-reservoir tank, one or more protein skimmers, one or more rotating drum filters, one or more collection, tanks and/or plumbing with opening/closing valves. The water treatment system may further include an ultraviolet unit and an ozone unit for treating toxicity of water returned to the tank, if required for certain applications. Other components, known to a person skilled in the art, may be added to the water treatment system to ensure its operation and efficiency.

The product storage compartment/area may be provided with internal walls and ceiling comprising an insulating layer and/or channels through which air is pumped at the desired temperature so as to provide a heat exchanger to control the environment in the trailer. Such insulating layer and/or heat exchanger may also be provided to the mechanical room. The product storage area may be further provided with a means for storing the product, preferably, but not limited to, on trays placed on pallets for facilitating loading/unloading of the product. The product storage area may be provided with an oxygen control system for controlling a level of oxygen within the trailer. The product storage area may include one or more probes/sensors for monitoring detecting a water property so as to control operation of the water treatment system. The product storage area may be also provided with probes/sensors for temperature, humidity, pressure, ammonia, carbon dioxide, pH, or any other parameter deemed necessary for the preservation of the product. Preferably, the probes/sensors provide data to a monitoring system for monitoring locally and/or remotely the trailer.

In a preferred embodiment, the product storage area is provided with a spray and fog system for creating/supporting a wet controlled environment, a refrigeration system for controlling the temperature within the product storage area, as well as means for draining the water from the product storage area to one or more collection receptacles/tanks located, preferably, below the product storage area or alternatively a sump and vacuum system for removing water sprayed in the product storage area to the collection tank or any other method known to a person skilled in the art for collecting and moving the water to the collection tank. In one embodiment of the present invention the spray and fog system may also control the temperature inside the product storage area by spraying water at the desired temperature.

In another preferred embodiment, the product is formed of aquatic organisms and the refrigeration unit is adapted to operate in two ranges, one of which is to maintain normal living temperature of the organisms and the other of which is to maintain the organisms substantially in a dormant state of biostasis. However, any other range of operation may be provided based on the properties of the product which is hauled with a view to preserving the product or preparing the product for loading/unloading.

In accordance with still another aspect of the present invention, there is provided a method for transporting a product in a container comprising the steps of: containing the product in a tray; spraying liquid in the container and onto the tray to wet the product; removing the liquid from the container and filtering and recycling the liquid before returning the liquid to the container; and maintaining a desired temperature inside the container.

In accordance with a further aspect of the present invention, there is provided a method for transporting live aquatic animals in a container comprising the steps of: containing the live aquatic animals in a tray; spraying liquid in the container and onto the tray to wet the live aquatic animals and clean away the animals waste; removing the liquid from the container and filtering and recycling the liquid before returning the liquid to the container; treating the animal waste in the liquid before returning the liquid to the container; and maintaining a desired temperature inside the container.

In accordance with a further aspect of the present invention, there is provided a method for transporting live aquatic animals in the trailer of the present invention comprising the steps of: containing the live aquatic animals in the tray; spraying liquid in the product storage compartment and onto the tray to wet the live aquatic animals and clean away the animals waste; removing the liquid from the product storage compartment and filtering and recycling the liquid before returning the liquid to the product storage compartment; treating the animal waste in the liquid before returning the liquid to the product storage compartment; and maintaining a desired temperature inside the product storage compartment.

Further scope of applicability of the present invention will become apparent from the detailed description given hereinafter. However, it should be understood that the detailed description and specific examples, while indicating preferred embodiments of the invention, are given by way of illustration and should not be construed as limiting the invention in any way since various changes and modifications within the spirit and scope of the invention will become apparent to those skilled in the art or science from this detailed description.

It is to be understood that each specific term includes all technical equivalents which operate in a similar manner to accomplish a similar purpose.

BRIEF DESCRIPTION OF THE DRAWINGS

Exemplary embodiments of the present invention will now be described in conjunction with the following drawings, in which.

DETAILED DESCRIPTION OF THE INVENTION

The following description is presented to enable a person skilled in the art or science to which the present invention pertains to make and use the invention, and is provided in the context of a particular application and its requirements. Various modifications to the disclosed embodiments will be readily apparent to those skilled in the art or science, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
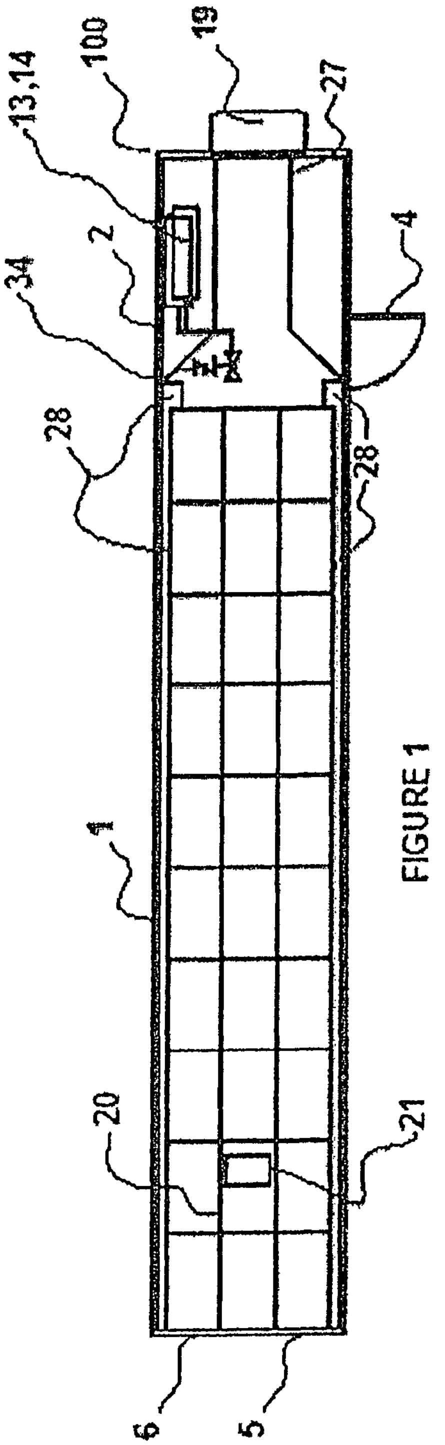
FIG. 1 shows a top sectional view of the container/trailer of the present invention.

Referring to FIG. 1 shown is a mobile insulated trailer or container (100). In one preferred embodiment of the invention, the trailer (100) is provided with a product storage area (1) and a mechanical room (2). The product storage area (1) is adapted to receive pallets (20) on which a portable storage means, preferably trays (21), are vertically disposed one on top of another. The function of the product storage area (1) is to provide a space to store the product during transport along with the trays and pallets necessary for carrying/holding the product. The product storage area (1) is preferably, located in the back of the trailer between the mechanical room and the loading doors. The mechanical room may be provided on one side thereof with a man-door (4). The function of the mechanical room (2) is to provide a space for the water treatment and refrigeration equipment. The mechanical room is, preferably, located in the front of the trailer between the product storage area and the front of the truck.

Loading/unloading doors (5, 6) are provided, preferably at the back of the trailer for easy access to the product storage area. The loading/unloading operation may be performed by placing the portable trays on a pallet and placing the pallet inside the trailer using a forklift.

The refrigeration unit (19) is preferably provided at the front of the trailer. The refrigeration unit is connected to the heat exchanger (28) in the product storage area via ductwork (27) to provide temperature control of the product storage area. The refrigeration unit is capable of delivering cool or warm air to the heat exchanger in the product storage area by simply diverting the air flow from the evaporator to the condenser or vice versa. Dry air delivered to the heat exchanger does not come in contact with the product in order to prevent drying out of the animals' gills. Preferably, the heat exchanger is sized to comprise the entire sidewalls and ceiling of the product storage area to provide as constant a temperature as possible inside the product storage area. The function of the heat exchanger is to provide a means of exchanging the energy in the air with its surroundings in the product storage area. The heat exchanger may be made of high-density polyethylene and fiberglass channels ribbing fastened and sealed to the trailer. The refrigeration system is also connected to the chiller barrels (13, 14), preferably located in the mechanical room, to provide cooling of the water contained in the integrated water treatment system. The refrigeration system is split, controlled by the PLC (31), where preferably the air temperature in the product storage area is its primary function and the water temperature in the integrated water Treatment System is its secondary function.

Figure 2:
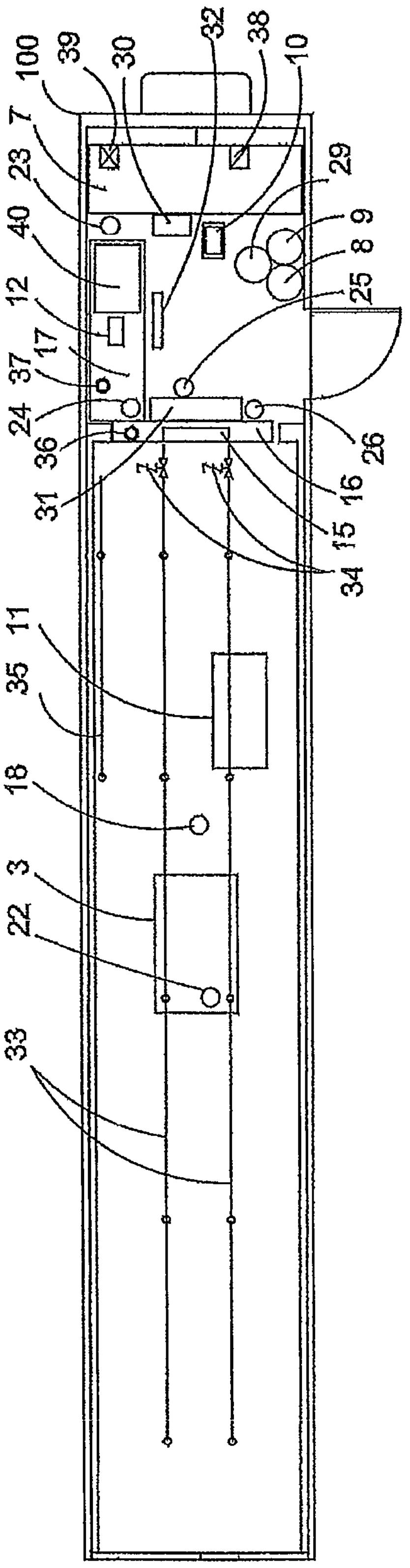
FIG. 2 shows a more detailed top sectional view of the container/trailer and related mechanical components attached thereto in accordance with the present invention.

Referring to FIG. 2 shown is a more detailed top sectional view of the trailer, the lower trailer and the product storage area showing all related mechanical components attached to the trailer. Preferably, the mechanical room, the lower trailer area and the product storage area house all components related to the integrated water treatment system and refrigeration system. The generator (11), which supplies all power for the LSTS (100), is located under the trailer. The collection tank (3) and collection pump (22) are attached to the underside of the trailer. The function of the collection tank (3) is to provide interim storage of water coming from the product storage area until the water can be pumped to the integrated water treatment system in the mechanical room. The tank (3) may be made of high-density polyethylene and reinforced for transport, however, any other suitable material may be used. The tank (3) is, preferably, equipped with inlet, outlet, vent, however any other ports known to one skilled in the art may be provided.

The $CO_2$ exhauster (18) is connected to the collection tank for removing carbon dioxide. The collection pump supplies water to the RDF (12). Water leaving the RDF enters the bio-reservoir (17) and backwash water leaving the RDF enters the RDF waste filter (40) to capture solids in the backwashed water waste stream. Water in the bio-reservoir is recirculated by the recirculation pump (23) through the protein skimmers (8,9), the biofilter (7), the bead collector (30) and the RDF before returning to the bio-reservoir. Water flowing through the protein skimmers generates foam, which flows to the foam collector (29). Air or oxygen to the biofilter is provided by a blower (10). After treatment, water from the bio-reservoir is pumped through the ultraviolet filter (32) to the spray reservoir (15) by bio-reservoir pump (24). Once in the spray reservoir, the spray pump (25) recirculates the water through chiller barrels (13, 14) for cooling. Once the required temperature is met, the spray pump (25) transfers the water to the spray system (33) for discharge over the product in the trays (21) in the product storage area. Zones valves (34) control the flow to the chiller barrels or the spray system. If the temperature in the bio-reservoir tank is too cold, the bio-reservoir heater (37) is turned on by the PLC to heat the water.

The integrated water treatment system has a biofilter to remove ammonia and nitrites, both of which are harmful to live aquatic animals, from the water. It is vital that the ammonia and nitrite are removed or converted to harmless nitrate from the water otherwise the gills will be burned and the animal will not be able to respire, thus death would ensue. To maintain a healthy bacteria culture in the biofilter during periods of inactivity, an ammonia injection pump (38) and an ammonia monitor (39) are provided as critical integral parts of the system. It is also important to maintain the product storage area at a temperature where the live aquatic animals are in a dormant state. The function of the biofilter is to reduce or eliminate water exchanges by converting harmful ammonia to harmless nitrate thereby allowing for a closed loop system. Ammonia ($NH_4^+$ and $NH_3$) originates from the brachial excretion from the gills of aquatic animals and from the decomposition of organic matter. As ammonia-N is highly toxic, this is converted to a less toxic form of nitrite (by *Nitrosomonas* sp.) and then to an even less toxic form of nitrate (by *Nitrobacter* sp.). This "nitification" process requires oxygen (aerobic Conditions), without which the biofilter would not function, and water for cleaning the biofilter media. The type of biofilter used is an expandable media filter, which comprises a biofilter tank filled with water and plastic biofilter beads and inoculated with nitrosomonas and nitrobacter bacteria. However, any other biofilters in any arrangements known to a person skilled in the art may be used. Preferably, the biofilter tank is connected to an air or oxygen supply and also a water supply for cleaning the beads.

Shown also in FIG. 2 is the fog system. The fog system is a system for humidification of the product storage area. Preferably, it comprises a fog reservoir (16), a fog pump (26) and a fog system (35) to provide humidification of the product storage area, which keeps the air moist for the live aquatic animals. The function of the fog reservoir (16) is to provide water storage for the fog system and in a preferred embodiment is made from high-density polyethylene and is equipped with inlet, outlet, vent, and ports for probes. The fog reservoir (16) may be reinforced for transport. Any other material known to a skilled person may be used as long as it is suitable for operation in accordance with the present invention.

Figure 3:
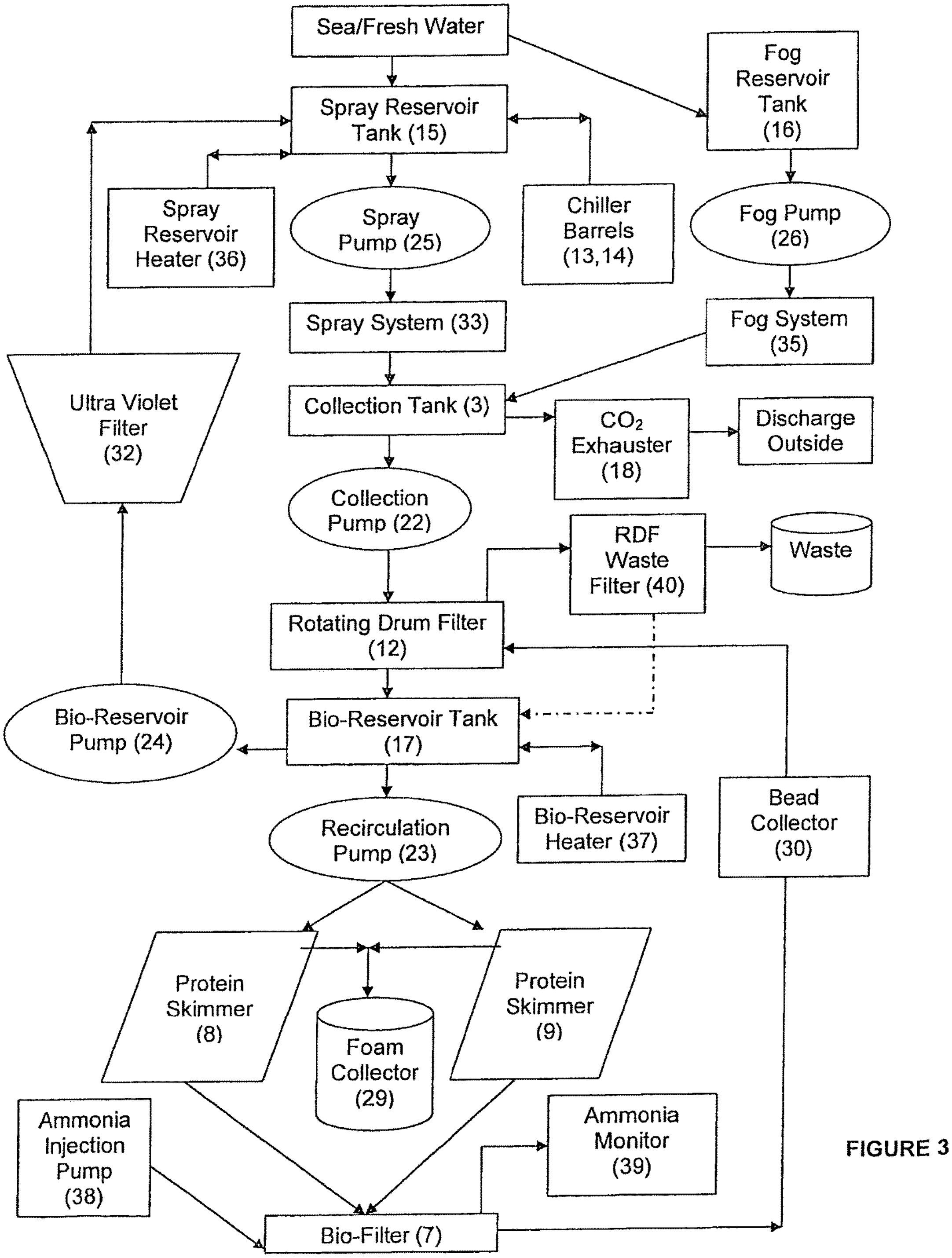
FIG. 3 shows a schematic view of one embodiment of the system for creating and maintaining a controlled micro-environment in accordance with the present invention.

Referring now to FIG. 3 shown is a schematic view of the system in accordance with the present invention. FIG. 3 shows the flow path of the processes occurring in the mechanical room, the product storage area and the underside of the trailer.

Experiments done with the system of the invention have shown that it is possible to hold some types of shellfish as long as 30 days before returning them to their natural or simulated environment. This has been achieved by maintaining the climate in the trailer (100) with a refrigeration system (19) and an integrated water treatment system which is complete with a spray system. The refrigeration system controls the temperature inside the product, storage area. By keeping the temperature of the animals low there is very little biological activity occurring. This reduces the waste products produced by the animals thereby reducing the size of the integrated water treatment system. The integrated water treatment system treats the waste products in the water thereby allowing a recirculating or a closed loop system. The spray/fog system provides the proper humidity and oxygen levels for maintaining the life of shellfish in the product storage area.

The LSTS (Live Seafood Transport System) of the present invention can be operated automatically or Manually. The entire process is controlled by the on-board PLC for both automatic and manual operation.

Figure 4:
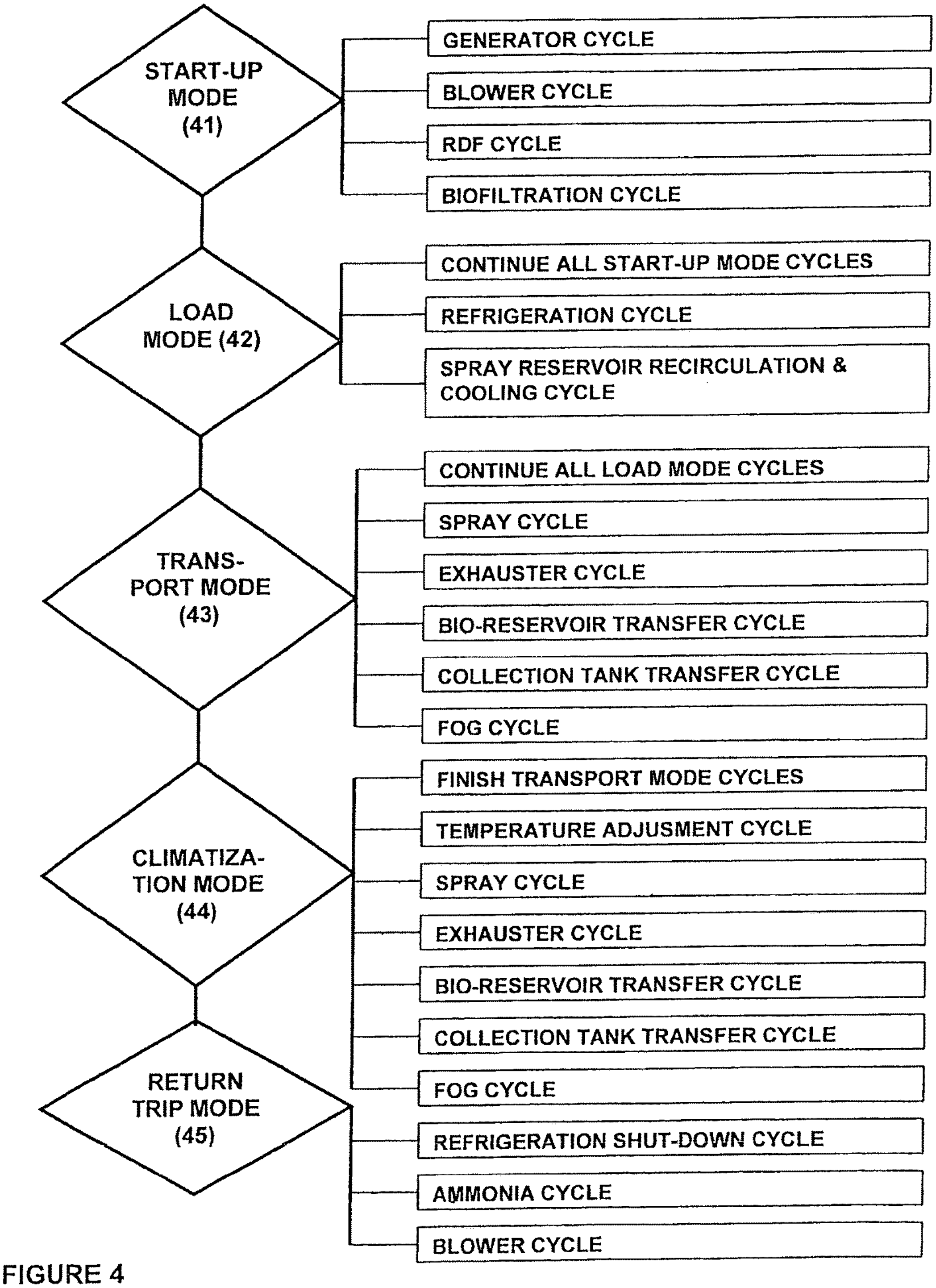
FIG. 4 shows a flow diagram of the modes and cycles of operation of the PLC in accordance with the present invention.

Referring now to FIG. 4, the PLC is pre-programmed with modes and cycles. Each mode is comprised of different cycles. A cycle turns on and controls a specific piece of equipment. Automatic operation has five different Modes of operation. Each Mode provides a specific function necessary far sustaining the life of the animals and/or maintaining the system in operation during the return trip. Each Mode has to be initiated by an operator since it is virtually impossible for the system to know when to change Modes.

In automatic operation, the operator selects the different modes as the transport progresses. The first mode is Start-up Mode (41) followed by, Load Mode (42), Transport Mode (43), Climatization Mode (44); and Return Trip Mode (45). The selection of modes starts all over again for the next load of product requiring transport. There are some tasks such as loading/unloading, filling the system with water, maintaining the system, water quality testing, and activation of the various modes during transport (so the PLC can monitor and control the function of the system) which may be manual in nature. These tasks have to be executed in conjunction with the operation of the system. In addition to automatic operation, the entire system can be run manually where the operator would start components or cycles of the system. During Manual Mode, the operator has to initiate the various cycles based on what is required. The PLC would still control the cycle while operating. Manual operation would normally only be used for initial commissioning, maintenance and testing of the system.

Programmable Logic Controllers (PLC) are commonly known in the art, and are not specific to the invention. Thus, it will be known to one skilled in the art how to integrate and operate such a device together with the system and method of the present invention.

Figure 5:
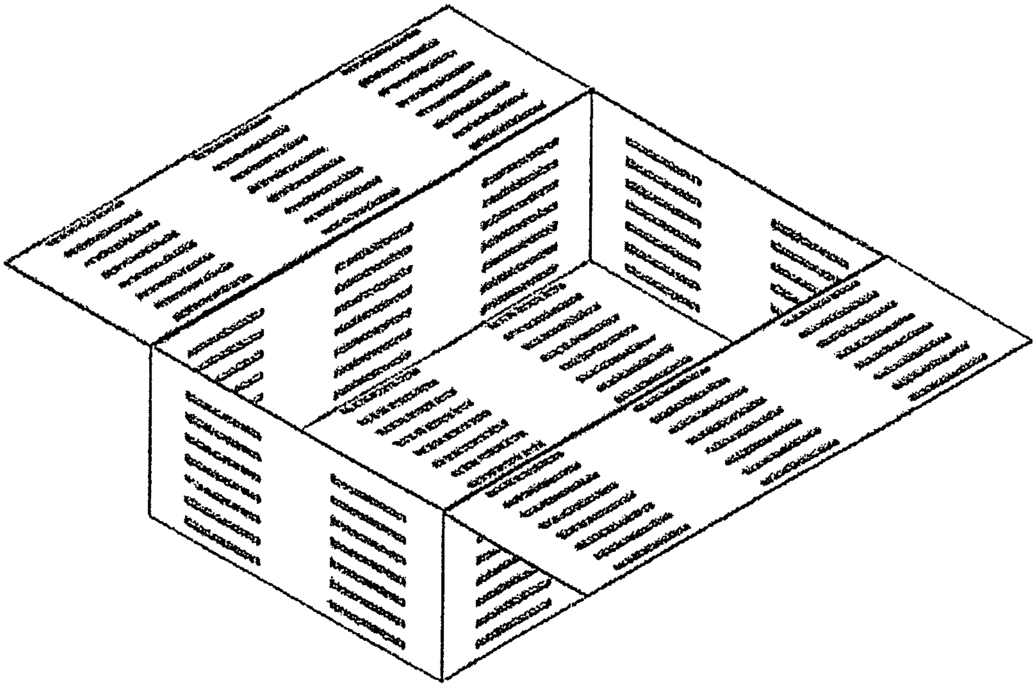
FIG. 5 shows an embodiment of a tray used in accordance with the present invention.

Referring now to FIG. 5 shown is an exemplary tray used in the present invention. Portable storage containers may be utilized in the product storage area Preferably, trays (21) having the top, the bottom and all sides slotted or grated may be used with a view to allowing water to pass through and preventing any accumulation of water therein. The trays may also be stackable one on top of another for transporting the product but also nestable to be compact during the return trip.

Figures 6A, 6B:
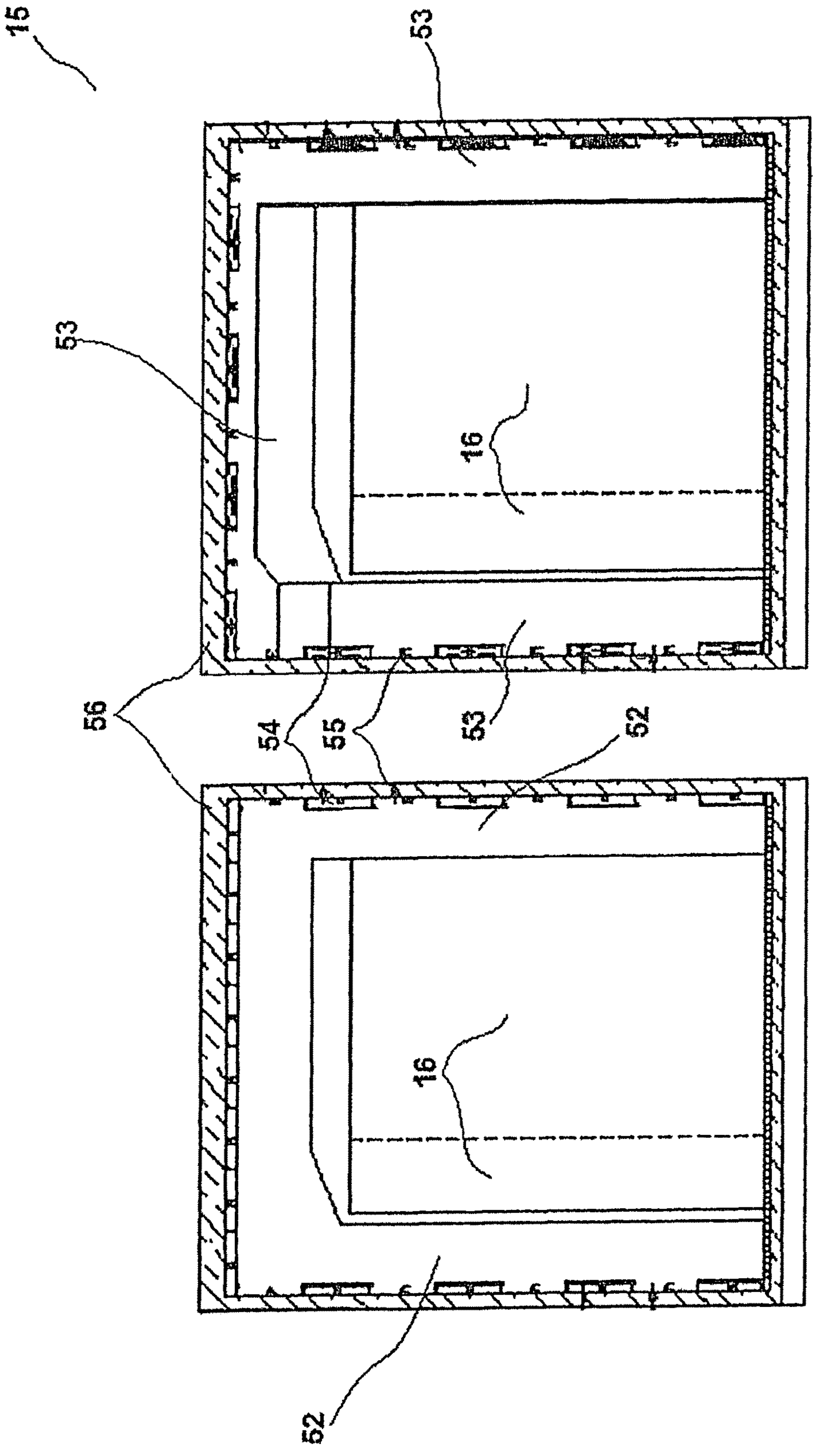
FIGS. 6A and 6B show a sectional view of the spray reservoir tank of the present invention.

Referring now to FIGS. 6A and 6B shown is a sectional view of the spray reservoir (15) and ductwork in the mechanical room (2). An insulating layer (56) may be provided to the trailer shell (50). Shown in FIGS. 6A and 6B are typical supply (54) and return (55) air which form a heat exchanger (28). Reference numerals 52 and 53 denote return and supply ducts, respectively. The fog reservoir is shown as reference numeral 16.

Figure 7:
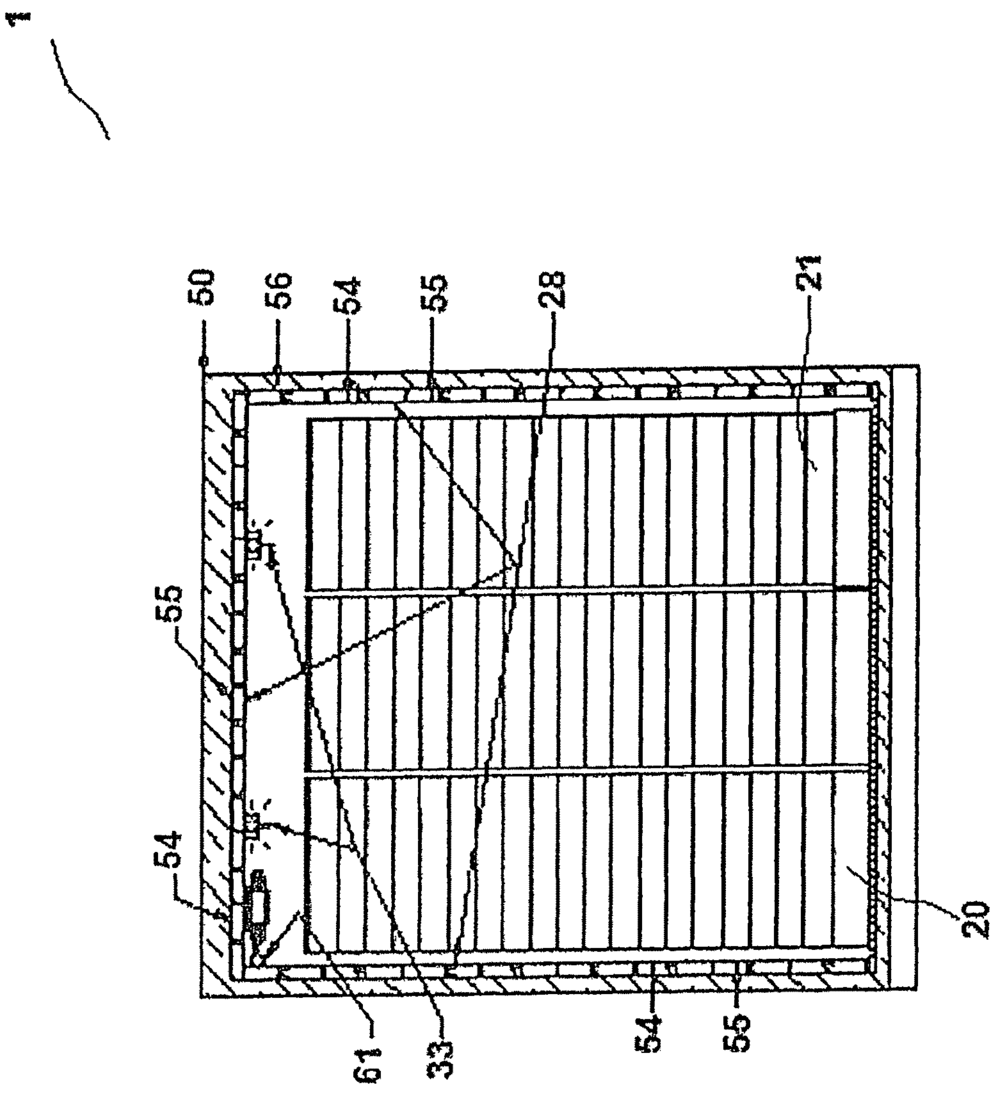
FIG. 7 shows a sectional view of the product storage area of the present invention.
Figure 8:
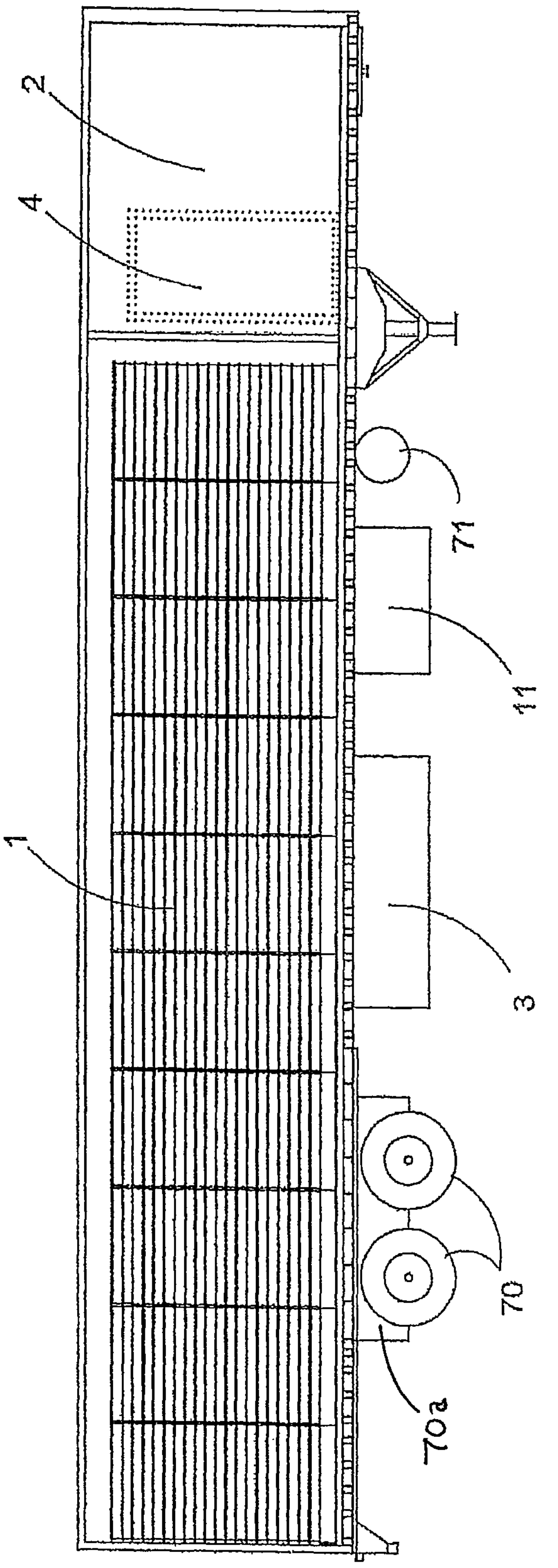
FIG. 8 shows a side view of the nonautomotive vehicle of the present invention with a storage compartment and a mechanical room according to an embodiment of the present invention.

Referring now to FIG. 7 shown is a sectional view of the product storage area (1). Shown are the trailer shell (50) with insulating layer (56) and a heat exchanger (28) with typical supply (54) and return (55) air, and spray system (33), tray 21, and pallet 20.

It is to be noted that the exemplary embodiment detailed above refers mainly to a trailer, however, a man skilled in the art should easily appreciate that the invention can be readily and easily applied to any container, such as for example, containers adapted for transportation by train, airplane, or watercraft with only minor changes and adaptations which should be known to a person skilled in the art or science pertaining to the subject invention.

In another embodiment of the present invention, the spray system, which provides wash-down of the waste products, and moisture, and oxygen to the gills, may also be adapted to cool/heat the product storage area. In this case the spray system uses the same general concept to achieve the design requirements but reduces the amount of equipment and allows more payload. In accordance with this embodiment seawater/water would provide the cooling/heating for the product area rather than the air in the ductwork. The refrigeration/heating system would cool/heat only the seawater/water and, thus, simplify the system since there would be no requirement for air cooling/heating. Seawater/water would be sprayed over the live shellfish/fish product and drained to the collection tank. From there it would be returned to the integrated water treatment system for treatment of the waste products. After treatment, seawater/water is recycled through the spray system. Thus, the seawater/water provides all the cooling/heating versus the air in the ductwork and wall panel heat exchanger. The spray system has to operate continuously or intermittently, however, more frequently than when cooling/heating was done through the air duct system, since it has the additional requirement of cooling/heating the product storage area.

Experiment 1

The LSTS comes ready for operation. This means the tanks are filled with water and the biofilter (7) is activated and ready for transporting live product. Should the LSTS be dormant for a period of time and the biofilter (7) not maintained, filling of the tanks and reactivating the biofilter (7) is required. This is achieved by connecting plant water to the system at its designated connection port and filling the biofilter (7), the bio-reservoir (17), the protein skimmers (8,9), spray reservoir (15) and fog reservoir (16) tanks and associated plumbing with water by opening/closing valves and starting the Biofilter Cycle in Manual Mode to achieve the required water volumes in these tanks. Once the tank levels are obtained, the Biofilter Cycle can be turned off. The next step is to activate the biofilter by injecting a quantity of ammonium chloride in the system to provide feed for the nitrifying bacteria, which is necessary for the removal of ammonia and nitrites, and activating the Blower Cycle. Depending on how it's done, it can take a period of time to establish a fully activated biofilter. Once fully activated, the biofilter requires a constant supply of ammonium chloride and oxygen to keep it always ready for operation. Once complete, the LSTS is ready for Start-up Mode (41).

Start-up Mode (41) has to be initiated approximately 2 hours prior to loading of product. It starts the generator (11), the Blower Cycle, the RDF Cycle and the Biofilter Cycle. Once all systems are started, the PLC (31) will alert the operator to change to Load Mode (42). This mode controls all the functions of the biofilter (7) by turning on various cycles in the proper sequence. This mode does not take much time to complete. Start-up Mode (41) will follow Return Trip Mode (45) for continuous trip operation.

Once Start-up Mode (41) is completed, the operator has to select Load Mode (42). Load Mode (42) will maintain all functions of Start-up Mode (41) and now activate the Refrigeration Cycle. Once, activated, the product area is cooled down to a set temperature. In addition, water from the spray reservoir is circulated through the chiller barrel to lower its temperature to the set-point or if required the immersion heater is turner on to add heat to the water to increase its temperature. The refrigeration system will alternate between cooling/heating the product storage area and cooling the spray reservoir. Water recirculates through the chiller barrel (13,14) until it meets the set-point temperature for flushing. When the product area reaches its set-point temperature, the PLC (31) will alert the operator that product can now be loaded (approximately 2 hours after initiating Start-up Mode (41)) in the product storage area (1). Product can be loaded while refrigeration of the water in the spray reservoir (15) will continue. Once the product is loaded and the set-point temperature for both the product storage area (1) and the spray reservoir (15) is reached, the system is ready for Transport Mode (43).

Upon completion of Load Mode (42), the operator has to select Transport Mode (43). Transport Mode (43) will maintain all functions of Load Mode (42). Once in Transport Mode (43) the system will confirm the temperature in spray reservoir (15) is at the set-point for flushing. It will then initiate a Flush Cycle. The spray pump (25) will be activated to pump water from spray reservoir (15) to the product storage area (1) by opening and closing zone valves #1, #2 and #3 in proper sequence. This will supply the shellfish/fish with clean oxygenated water. The spray water will cascade over the product, trays and pallets to the floor below. It will then drain to the collection tank (3) located below the trailer via the plumbing connected bellow the trailer. After the Flush Cycle is complete, the $C0_2$ exhauster (18) is turned on to exhaust gases in the collection tank (3). Next, water is transferred from the bio-reservoir (17) to the spray reservoir (15). U.V. disinfection occurs (for trailers with this option selected) during the transfer for product requiring sterilization such as mussels. Upon transfer, water in the spray reservoir is then recirculated through the chiller barrel to cool the treated water to the set-point temperature. After water is transferred to the spray reservoir (15), water is transferred from the collection tank (3) to the bio-reservoir (17) for treatment. During the transfer, water passes through the rotating drum filter (RDF) (12) for filtration. The RDF (12) is a self-cleaning rotating filter. Waste and backwash water from the RDF (12) is passed through the RDF waste filter in the top compartment of the bio-reservoir (17) where the waste is retained and the backwash water is returned to the bio-reservoir (17). Filtered water that passes through the RDF (12) is discharged directly to the bio-reservoir (17) below. Once the transfer is complete to the bio-reservoir (17), it is then pumped through the protein skimmers (8,9) to the biofilter (7) for treatment. It then flows by gravity from the biofilter (7) to the bead collector (30) and then overflows to the RDF (12) to return to the bio-reservoir (17) for recirculation. The protein skimmers (8,9) remove proteins and organic waste and the biofilter (7) provides digestion of the ammonia and nitrites. The bead collector (30), which is a component of the biofilter (7), removes any bio-beads that get carried through the system and returns them to the biofilter (7). Water from the collection tank (3) is processed for a set period of time to remove all the contaminants by continuously recirculating them through the protein skimmers (8,9) and the biofilter (7). This process continues for a preset period of time or based on the ammonia level in the biofilter (7). Once the time period has elapsed, the Flush Cycle can start again and the cycle continues until the product is near its destination place. Concurrent with the above modes and cycles is a Fog or Humidification Cycle. It is independent from the above cycles and it provides for intermittent humidification of the product area.

The next mode of operation is Climatization Mode (44). The operator selects Climatization Mode (44) 4 hrs before arriving at the destination place. Climatization Mode (44) will maintain all functions of the previous modes but it will adjust the temperature of the product area to a pre-programmed value (which is dependant on the type of product) which is slightly warmer than the transport temperature. This is necessary to prepare the product for its destination place where the temperature is warmer. Once selected, the PLC (31) will check the temperature of spray reservoir (15). If the temperature is below the new set-point, the PLC (31) will complete Transport Mode (43) by, initiating a flush cycle to empty the spray reservoir (15) of the cooler water. Water will then go through the same cycles as Transport Mode (43) with the only difference being that the temperature for the product area and the spray reservoir will be slightly higher. Climatization Mode (44) will only activate one flush cycle at the new set-point temperature. Once one cycle is completed, the PLC (31) will warn the operator that the product is ready for unloading. It will continue to maintain the temperature in the product storage area (1) until the mode is changed. There will be no flushing or fogging occurring in the product area (1) while the product is unloaded.

After the product is unloaded, the next mode of operation is Return Trip Mode (45). The operator has to select Return Trip Mode (45) after the product is unloaded. This mode automatically shuts down the Refrigeration Cycle since it is no longer required and will turn off equipment not used during the return trip. It will maintain the blower (10) on intermittent operation to provide enough oxygen for the biofilter (7). It will turn on the ammonia monitor (39) and ammonia injection pump (38) (for systems equipped with an ammonia monitor (39) and ammonia injection pump (38) otherwise manual ammonia addition is required) intermittently for injection of ammonium chloride to provide food for the nitrifying bacteria thus maintaining a fully activated biofilter (7).

INDUSTRIAL APPLICABILITY

The invention provides a system, particularly, a container/trailer for transporting product, preferably, live aquatic animals over long distances. The system may be used to create and maintain a micro-environment for product such as, for example, live aquatic animals, which can be monitored and controlled locally and remotely. The system of the present invention may be, preferably, adapted to a trailer, however, may also be adapted for use with other means of transportation such as for example, airplanes, trains, and watercraft.

LIST OF REFERENCE NUMERALS

Product Storage Area (1)
Mechanical Room (2)
Collection Tank (3)
Man-door (4)
Loading/Unloading doors (5,6)
Biofilter (7)
Protein Skimmers (8,9)
Blower (10)
Generator (11)
Rotating Drum Filter (12)
Chiller Barrels (13,14)
Spray Reservoir (15)
Fog Reservoir (16)
Bio-Reservoir (17)
$CO_2$ Exhauster (18)
Refrigeration Unit (19)
Pallets (20)
Trays (21)
Collection Pump (22)
Recirculation Pump (23)
Bio-Reservoir Pump (24)
Spray Pump (25)
Fog Pump (26)
Ductwork (27)
Heat Exchanger (28)
Foam Collector (29)
Bead Collector (30)
PLC & Electrical Panel (31)
Ultra Violet Filter (32)
Spray System (33)
Zone Valves (34)
Fog System (35)
Spray Reservoir Heater (36)
Bio-Reservoir Heater (37)
Ammonia Injection Pump (38),
Ammonia Monitor (39)
RDF Waste Filter (40)
Start-up Mode (41)
Load Mode (42)
Transport Mode (43)
Climatization Mode (44)
Return Trip Mode (45)
Trailer Wheels (70)
Trailer Wheel Supports (70*a*)
Trailer Chassis (71)
LSTS—Trailer (100)

The aforesaid description and drawings presented herein teach in considerable detail workable embodiments within the broad concept of the present invention. However, in order to facilitate comprehension of the invention's mode of operation by a person skilled in the art, the list of reference numerals associated with each technical feature of the invention is provided, herein along with a brief description of several technical features identified therein. It is particularly noted that the description of the technical features as provided hereinbelow should not be construed as limiting the invention in any way and that each specific term includes all technical equivalents which operate in a similar manner to accomplish a similar purpose.

Product Storage Area (1)—The function of this area is to provide a space to store the product during transport along with the trays and pallets necessary for carrying/holding the product. The product storage area is, preferably, located in the back of the trailer between the mechanical room and the loading doors.

Mechanical Room (2)—The function of this area is to provide a space for the water treatment and refrigeration equipment. The mechanical room is, preferably, located in the front of the trailer between the product storage area and the front of the truck.

Collection Tank (3)—The function of the collection tank is to provide interim storage of water coming from the product storage area until the water can be pumped to the integrated water, treatment system in the mechanical room. The tank is, in a preferred embodiment, located under the trailer and it may be made of high-density polyethylene and reinforced for transport. Any other material known to a skilled person may be used for the construction of the collection tank. It may be equipped with inlet, outlet, vent and other ports.

Man-door (4)—The function of the man-door is to provide access to the equipment room. The man-door may be, for example, located on the passenger side of the trailer near the back of the equipment room.

Loading/Unloading Doors (5,6)—The function of the loading doors is provide access to the product storage area for loading and unloading product.

Biofilter (7)—The function of the biofilter is to reduce or eliminate water exchanges by converting harmful ammonia to harmless nitrate thereby allowing for a closed loop system. Ammonia. ($NH_4^+$ and $NH_3$) originates from the brachial excretion from the gills of aquatic animals and from the decomposition of organic matter. As ammonia-N is highly toxic, this is converted to a less toxic form of nitrite (by *Nitrosomonas* sp.) and then to an even less toxic font of nitrate (by *Nitrobacter* sp.). This "nitification" process requires oxygen (aerobic conditions), without which the biofilter would not function, and water for cleaning the biofilter media. The type of biofilter used may be, for example, an expandable media filter, which comprises a biofilter tank filled with water and plastic biofilter beads and inoculated with nitrosomonas and nitrobacter bacteria. Any other type of biofilter known to a person skilled in the art may be used. Additionally, the biofilter tank may be connected to an air or oxygen supply and also a water supply for cleaning the beads.

Protein Skimmer (8,9)—The function of the protein skimmer is to remove organic and some inorganic material that is bound to the organic material from the water to lessen the load on the biofilter. It does this by using the polarity of the protein or organic material. The type of protein skimmer which may be used is a co-current venturi skimmer. It consists of a long cylinder with a cone shaped top. Inlet and outlet plumbing are connected to the skimmer. A venturi is connected to the inlet pipe for introducing air to the water for treatment. At the top of the skimmer is a discharge port where foam is discharged from the skimmer.

Blower (10)—The function of the blower or air pump is to provide air or oxygen to the biofilter necessary in the nitrification process. Any blower known to person skilled in the art may be used.

Generator (11)—The function of the generator is to provide electrical power for the equipment. Preferably, a 12-kilowatt diesel generator may be used for supplying the LSTS with electrical energy. The generator may be controlled by the PLC thereby supplying electrical power when it is required.

Rotating Drum Filter (RDF) (12)—The function of the RDF is to remove particles from the water. The RDF may be a self-cleaning rotating drum filter driven by an electric motor. Preferably, water enters the inside of the rotating drum and flows through a 60-micron screen discharging to the bottom of the container. Particles larger than the screen size are captured and collect on the screen. As the screen rotates the particulars dewater and stick to the screen. As the screen reaches the top the filtered particles are washed off using a spray system with system backwash water. Backwash water and particulars are captured on a trough located inside and above the drum shaft and are washed out of the system to a large filter bag at the top of the bio-reservoir for capture. The debris entering the bag is captured while the water returns to the system for reuse. The bottom of the RDF container has a discharge port so water drains by gravity out of the RDF.

Chiller Barrel (13,14)—The chiller barrel function is to cool the water in the integrated water treatment system. The chiller barrel may have a PVC outer shell and a dual core titanium tube evaporator inside. The chiller barrel may be baffled, to create turbulent flow for better heat exchange and may have inlet and outlet connects for refrigerant and water.

Spray Reservoir (15)—The function of the spray reservoir is to provide a storage volume for both the spraying system. The tanks may be made from high-density polyethylene and may come equipped with inlet, outlet, vent, and ports for probes. The tank may be reinforced for transport.

Fog Reservoir (16)—The function of the fog reservoir is to provide water storage for the fog system. The tank may be made from high-density polyethylene and may be equipped with inlet, outlet, vent, and ports for probes. The tank may be reinforced for transport.

Bio-Reservoir (17)—The function of the bio-reservoir is to provide a water storage volume for the spray system. The tank may be made from high-density polyethylene and is equipped with inlet, outlet, vent, and ports for probes. The tank may be reinforced for transport.

$CO_2$ Exhauster (18)—The function of the $CO_2$ exhauster is to remove $CO_2$ gas in the Collection Tank. Any exhauster known to a skilled man in the art may be used if suitable for operation in accordance with the present invention.

Refrigeration Unit (19)—The function of the refrigeration unit is to provide a means for heating and cooling the air and also a means for cooling the water.

Pallets (20)—The function of the pallet is to stack, hold and carry tray during loading, unloading and transporting the product. The pallet may be made from high density polyethylene for durability, ease of cleaning, non-corrosive and non-water absorbing properties but other types known in the art may also be used.

Tray (21)—The function of the tray is to hold the lobster while in transit. Typically a tray is perforated in order for water to flow through and not accumulate but other types may be used depending on the application. For example, in other preferred embodiment the tray may also be provided with a recess and/or slots so as to allow a predetermined amount of water to remain captive therein for the purpose of transportation of finfish.

Collection Pump (22)—The function of the collection pump is to transfer water from the collection tank to the bio-reservoir. Any pump known to a skilled man in the art may be used for the collection pump.

Recirculation Pump (23)—The function of the recirculation pump is to circulate water from the bio-reservoir through the protein skimmer, the biofilter, the bead collector and the RDF to return to the bio-reservoir. Any pump known to a skilled man in the art may be used for the recirculation pump.

Bio-Reservoir Pump (24)—The function of the bio-reservoir pump is to transfer the water from the bio-reservoir to the reservoir tank. Any pump known to a skilled man in the art may be used for the bio-reservoir pump.

Spray Pump (25)—The function of the spray pump is to transfer the water from the spray tank to the spray'system. Any pump known to a skilled man in the art may be used for the spray pump.

Fog Pump (26)—The function of the fog pump is to transfer the water from the fog reservoir to the fog system. Any pump known to a skilled man in the art may be used for the fog pump.

Ductwork (27)—The function of the supply and return ductwork both is to provide a means for air to circulate between the refrigeration system and the heat exchanger. The ductwork should be made from non-corrosive material, preferably, high, density polyethylene Material or similar material.

Heat Exchanger (28)—The function of the heat exchanger is to provide a means of exchanging the energy in the air with its surroundings in the product storage area. The heat exchanger, preferably, encompasses the sidewalls and ceiling area of the product storage area of the trailer. It may be made of high-density polyethylene and fiberglass channels ribbing fastened and sealed to the trailer. However, any other material may be used as long as its operation and function are similar.

Foam Collector (29)—The function of the foam collector, is to provide a container to collect the organic and inorganic material discharged in the foam from the protein skimmer. It is a container made from high-density polyethylene, or any other suitable material known to a person skilled in the art, with inlet, outlet and vent ports.

Bead Collector (30)—The function of the bead collector is to provide a means of capturing biofilter beads that escape the biofilter and return them to the biofilter through the use of an air-lift. The bead collector is a simple device made from H.D.P.E. It has an inlet chamber for slowing down the flow followed by a separating chamber where a large screen collects the beads in one location. An air-lift is located in the middle chamber. The last chamber is the outlet chamber where the filtered water collects and leaves the device.

PLC & Electrical Panel (31)—The function of the PLC & Electrical panel is to provide power to and control of all electrical components necessary for the integrated water treatment and refrigeration system. The PLC & Electrical Panel may include the following: a water resistant PVC electrical Panel, PLC and display screen, wires, fuses, breakers, switches, relays, transformers, etc. required for operation and connection to all equipment.

Ultra Violet Filter (32)—The function of the ultra violet filter is to disinfect the water going to the reservoir tank for all live aquatic animals where it is required such as mussels. Any ultra violet filters known to a man skilled in the art may be used for the system.

Spray System (33)—The function of the spray system is to provide a means for dispersing water intermittently over the live aquatic animals held in the trays in the product storage area. The spray system may be made of plastic pipe complete with fittings, valves and nozzles for dispersing the water into a spray. Any other material known to a man skilled in the art may used to manufacture the spray system.

Zone Valve (34)—The function of the zone valve is to provide a means of diverting the water discharged by the spray pump to the chiller barrel for cooling or to the spray system for dispersing over the product in the trays. Any known zone valves may used for the system.

Fog System (35)—The function of the fog system is to provide a means for dispersing a fine fog intermittently in the product storage area to keep the humidity at or near 100% moisture when the spray system is not operating. The fog system may be made of plastic pipe complete with fittings, valves and nozzles for dispersing the water into a fine fog. Any other material known to a person skilled in the art may be used to manufacture the fog system.

Spray Reservoir Heater (36)—The function of the spray reservoir heater is to heat the water in the event that the water is too cold for discharging in over the product. Any immersion type heater or similar heater known to a man skilled in the art may be used for the application.

Bio-Reservoir Heater (37)—The function of the bio-reservoir heater is to heat the water in the Bio-reservoir if the water is too cold in the biofilter for digesting ammonia and nitrites. Any immersion type heater or similar heater known to a man skilled in the art may be used for the application.

Ammonia Injection Pump (38)—The function of the ammonia injection pump is to pump ammonium chloride to the biofilter during periods of inactivity to keep the bacteria in the biofilter growing.

Ammonia/Dissolved Oxygen Monitor (39)—The function of the ammonia/dissolved oxygen monitor is to measure the level of ammonia and dissolved oxygen in the water and output the data to the PLC. Any ammonia/dissolved oxygen monitor known in the art may be used for the application.

RDF Waste Filter (40)—The function of the RDF waste filter is to capture the solid waste in the RDF backwash line and allow the water to return to the bio-reservoir.

The embodiments of the present invention in which an exclusive property or privilege is claimed are defined as follows:

1. An apparatus for transporting live aquatic animals comprising a trailer chassis including:

a trailer shell including a platform, side walls projecting upwardly from the platform, and a ceiling extending between the side walls to define an enclosed space, the enclosed space being partitioned into a product storage compartment and a mechanical chamber;

a plurality of wheel supports attached to the trailer shell;

a ground engaging wheel rotatably mounted to each of the wheel supports;

an insulating layer provided on the side walls and the ceiling of both the product storage compartment and the mechanical chamber of the trailer shell;

a heat exchanger provided on the side walls and the ceiling of the product storage compartment of the trailer shell and including a supply air passageway and a return air passageway that extend through the mechanical chamber, the heat exchanger operative to maintain a predetermined temperature within the product storage compartment of the enclosed space;

a liquid spray system provided on the ceiling of the product storage compartment of the trailer shell, the liquid spray system operative to spray liquid within the product storage compartment of the enclosed space;

a collection tank attached to the trailer shell, which is adapted to collect and store water from the product storage compartment;

liquid temperature regulation equipment including a chiller and a heater within the mechanical chamber, the liquid temperature regulation equipment adapted to regulate liquid temperature prior to being pumped to the liquid spray system;

a collection pump attached to the trailer shell, the collection pump operative to return the spray liquid from the collection tank to the liquid spray system;

a biofilter that is operative to reduce metabolic waste in the collected liquid prior to the liquid being pumped to the liquid spray system;

a blower to aerate the collected liquid; and a fog system comprising a fog reservoir, a fog pump, and a fog distribution system, the fog system adapted to disperse liquid as a fine fog within the product storage compartment to maintain a desired humidity.

2. The apparatus defined in claim 1 further including a programmable logic controller that controls the spraying of the liquid onto at least one tray provided within the product storage compartment of the enclosed space, the collecting of the liquid in the collection tank, and the returning of the sprayed liquid from the collection tank through the mechanical chamber to the liquid spray system.

3. The apparatus defined in claim 2 wherein the programmable logic controller is set up with modes and cycles.

4. The apparatus defined in claim 3 wherein the modes include a start-up mode, a load mode, a transport mode, a climatization mode, and a return trip mode.

5. The apparatus defined in claim 4 wherein the start-up mode includes a blower cycle, a rotating drum filter cycle, and a biofiltration cycle.

6. The apparatus defined in claim 4 wherein the load mode includes a blower cycle, a rotating drum filter cycle, a biofiltration cycle, and a refrigeration cycle.

7. The apparatus defined in claim 4 wherein the transport mode includes a blower cycle, a rotating drum filter cycle, a biofiltration cycle, a refrigeration cycle, and a generator start cycle.

8. The apparatus defined in claim 4 wherein the climatization mode includes a blower cycle, a rotating drum filter cycle, a biofiltration cycle, a refrigeration cycle, a generator start cycle, and a temperature adjusting cycle.

9. The apparatus defined in claim 4 wherein the return trip mode comprises a blower cycle.

10. The apparatus defined in claim 2 wherein the programmable logic controller is responsive to temperature, pressure, and humidity inside the product storage compartment.

11. The apparatus defined in claim 1 wherein the liquid is one of freshwater, seawater, synthetic seawater, and distilled water, or combinations thereof.

12. The apparatus for transporting live aquatic animals of claim 1, wherein when the temperature of the liquid is regulated by the liquid temperature regulation equipment, the temperature of the liquid is lowered by the chiller if the temperature of the liquid is above a set temperature and the temperature of the liquid is raised by the heater if the temperature of the liquid is below the set temperature.

13. The apparatus for transporting live aquatic animals of claim 1, wherein the liquid temperature regulation equipment is operative in a transport mode to regulate the temperature of the liquid to a set temperature and wherein the liquid temperature regulation equipment is operative in a climatization mode to regulate the temperature of the liquid to a second temperature that is warmer than the set temperature.

14. The apparatus for transporting live aquatic animals of claim 13, wherein the liquid temperature regulation equipment heater is operative to raise the temperature of the liquid when the liquid temperature regulation equipment is operative in the climatization mode.

15. The apparatus for transporting live aquatic animals of claim 1, wherein one of cool air and warm air from a refrigeration system is supplied to the supply air passageway to maintain a predetermined temperature within the product storage compartment of the enclosed space.

16. The apparatus for transporting live aquatic animals of claim 1, wherein the fog system is operative to disperse a fine fog into the storage compartment to maintain the desired humidity when the spray system is not operating.

17. The apparatus for transporting live aquatic animals of claim 16, wherein the liquid spray system is adapted to spray liquid onto a tray to wet live aquatic animals and clean away animal waste.

* * * * *